(12) United States Patent
Seki et al.

(10) Patent No.: US 11,921,389 B2
(45) Date of Patent: Mar. 5, 2024

(54) DISPLAY DEVICE, METHOD OF MANUFACTURING THE SAME, AND ELECTRONIC DEVICE

(71) Applicant: Japan Display Inc., Tokyo (JP)

(72) Inventors: Kenta Seki, Aichi (JP); Seiji Uejima, Aichi (JP); Ryo Yamaoka, Aichi (JP); Hidemasa Yamaguchi, Aichi (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/974,593

(22) Filed: Oct. 27, 2022

(65) Prior Publication Data

US 2023/0049169 A1    Feb. 16, 2023

Related U.S. Application Data

(63) Continuation of application No. 17/409,065, filed on Aug. 23, 2021, now Pat. No. 11,635,662, which is a
(Continued)

(30) Foreign Application Priority Data

Mar. 21, 2012 (JP) ................ 2012-064162

(51) Int. Cl.
| | |
|---|---|
| *G02F 1/1335* | (2006.01) |
| *G02F 1/1333* | (2006.01) |
| *G02F 1/1339* | (2006.01) |
| *G02F 1/1343* | (2006.01) |
| *G02F 1/1362* | (2006.01) |

(Continued)

(52) U.S. Cl.
CPC .. *G02F 1/136286* (2013.01); *G02F 1/133308* (2013.01); *G02F 1/133512* (2013.01); *G02F 1/133514* (2013.01); *G02F 1/1339* (2013.01); *G02F 1/134336* (2013.01); *G02F 1/1368* (2013.01); *H01J 9/205* (2013.01);
(Continued)

(58) Field of Classification Search
CPC ...... G02F 1/133; G02F 1/1339; G02F 1/1333; G02F 1/133308; G02F 1/133325; G02F 1/13332; G02F 1/133331; G02F 1/133388; G02F 1/1335; G02F 1/133512; G02F 1/133514; G02F 1/133528; G02F 1/134336; G02F 1/1362; G02F 1/136286; G02F 1/136209; G02F 1/1368; H01J 9/205

See application file for complete search history.

(56) References Cited

U.S. PATENT DOCUMENTS

2004/0227895 A1\* 11/2004 Yoo ................ G02F 1/1339
                                                    349/152
2013/0154949 A1\* 6/2013 Jamshidi Roudbari ...............
                                                    G06F 3/0412
                                                    349/110

\* cited by examiner

*Primary Examiner* — Thoi V Duong
(74) *Attorney, Agent, or Firm* — Michael Best & Friedrich LLP

(57) ABSTRACT

A display device includes a display section in which a plurality of pixels are arrayed in a matrix, a plurality of scan lines which select pixels, a plurality of signal lines which supply image signals to the selected pixels, and color filters that are arranged so as to correspond to color displays of the pixels. In the device, the display section includes an effective pixel portion and a frame portion that surrounds the effective pixel portion, and the frame portion and a wiring circuit of the effective pixel portion are covered with light-shielding layers, the light-shielding layers being separated from each other at a certain separation location in the display section, and a plurality of color filters having different colors are arranged by being stacked at the separation location.

15 Claims, 11 Drawing Sheets

Related U.S. Application Data continuation of application No. 16/927,455, filed on Jul. 13, 2020, now Pat. No. 11,156,886, which is a continuation of application No. 16/130,781, filed on Sep. 13, 2018, now abandoned, which is a continuation of application No. 15/331,361, filed on Oct. 21, 2016, now Pat. No. 10,101,623, which is a continuation of application No. 14/573,317, filed on Dec. 17, 2014, now Pat. No. 9,500,897, which is a continuation of application No. 13/682,875, filed on Nov. 21, 2012, now Pat. No. 8,934,073.

(51) Int. Cl.
*G02F 1/1368* (2006.01)
*H01J 9/20* (2006.01)

(52) U.S. Cl.
CPC .... *G02F 1/13332* (2021.01); *G02F 1/133325* (2021.01); *G02F 1/133388* (2021.01)

FIG. 1A
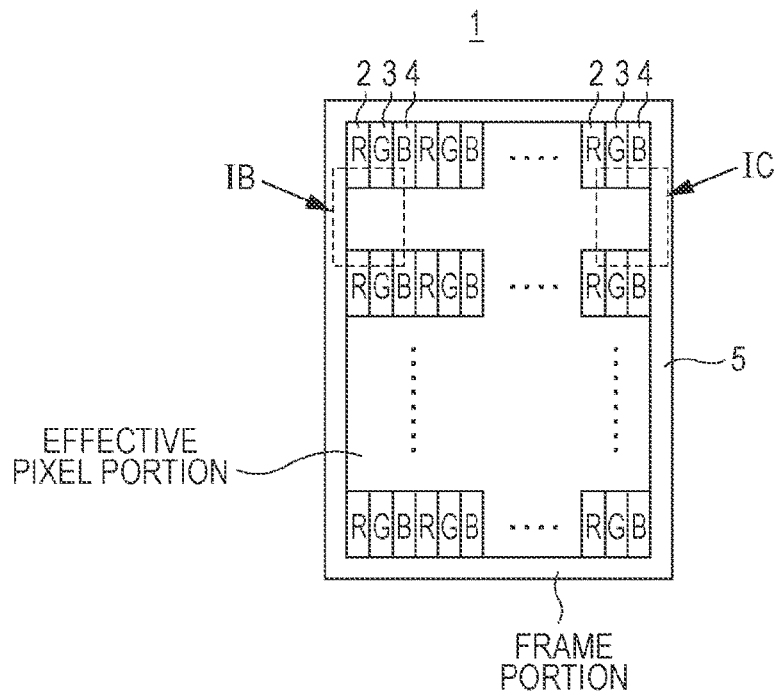
FIG. 1B
FIG. 1C
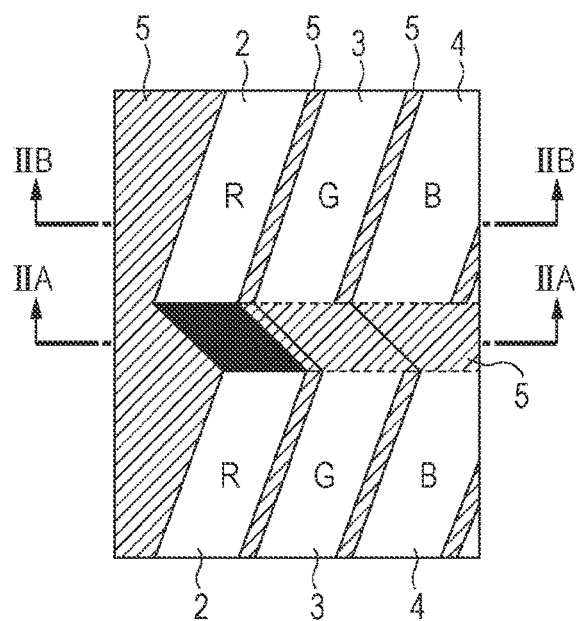
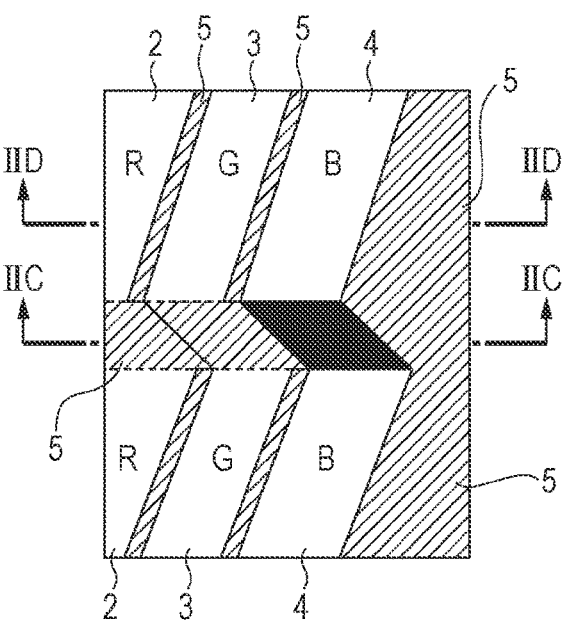

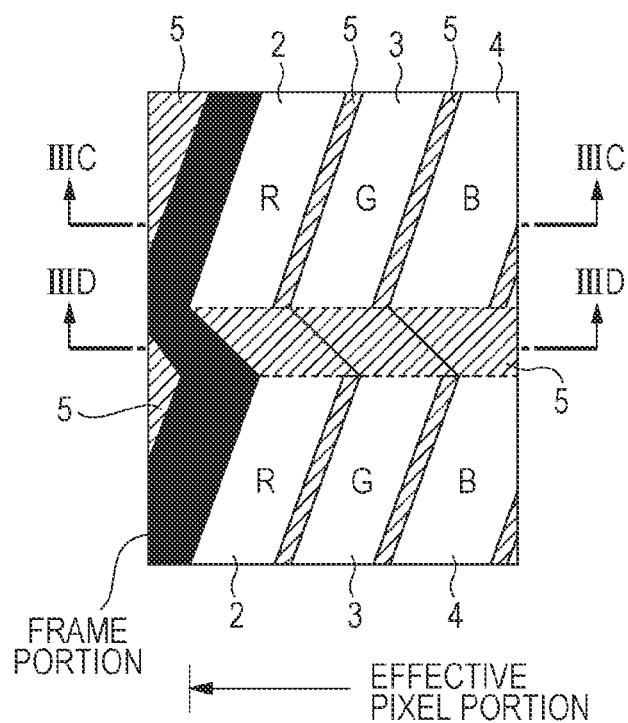
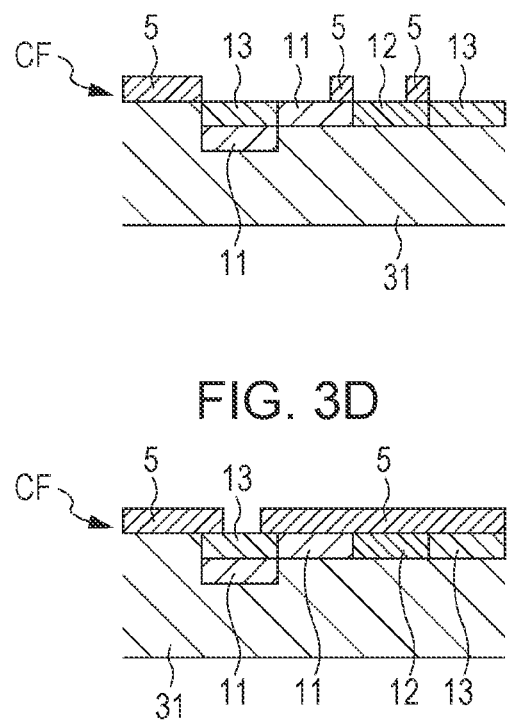
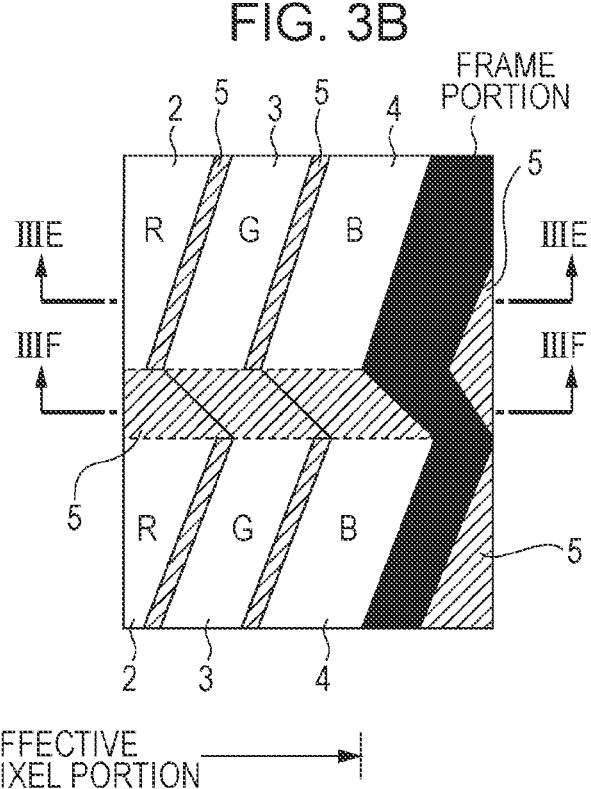
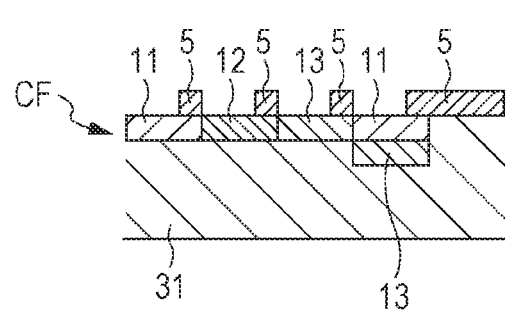
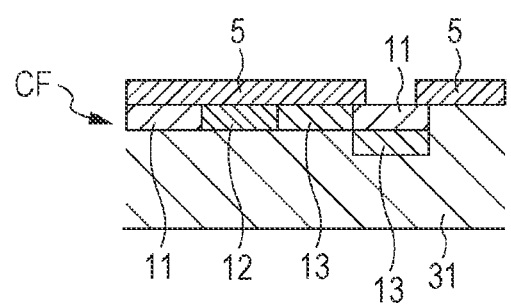

EFFECTIVE PIXEL PORTION    FRAME PORTION

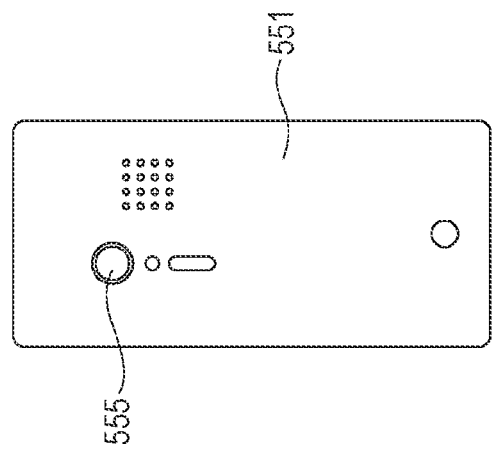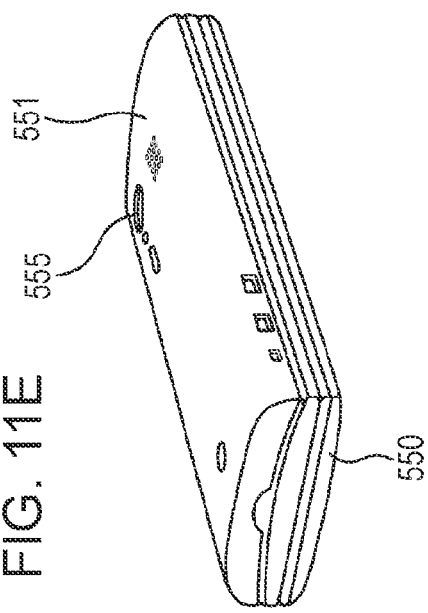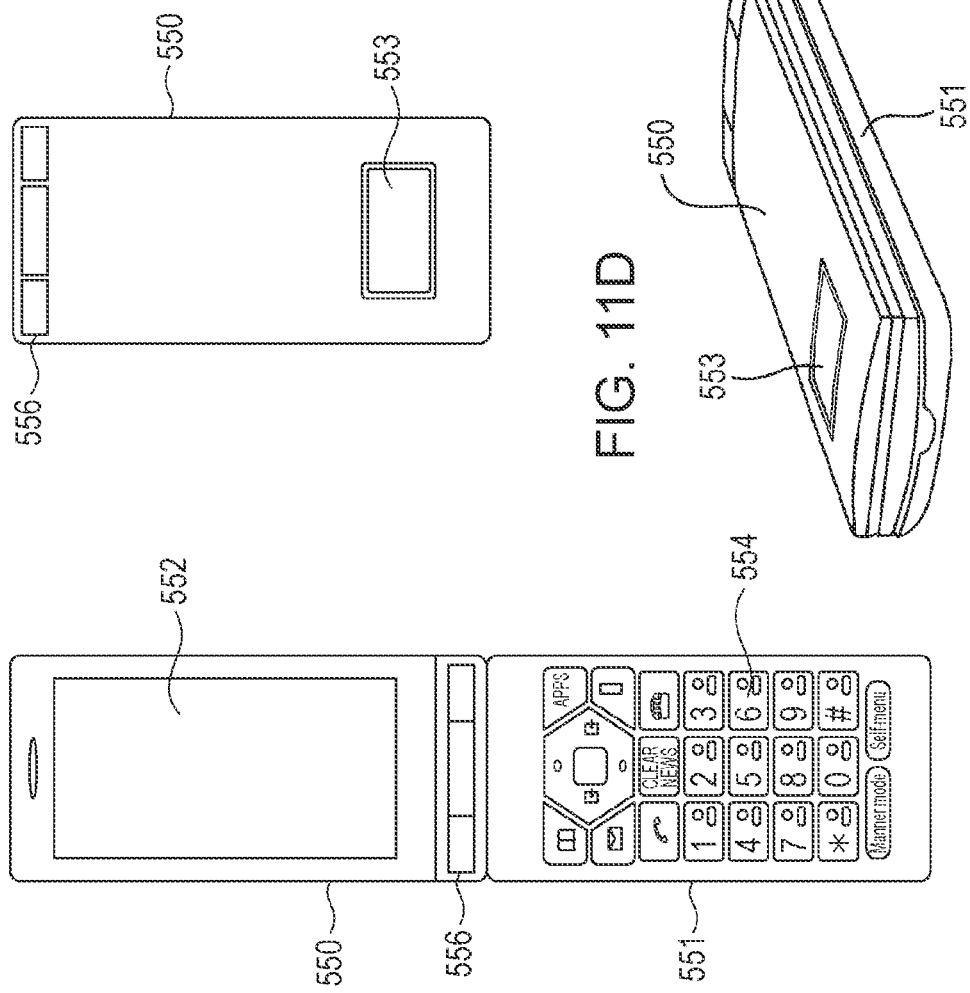

DISPLAY DEVICE, METHOD OF MANUFACTURING THE SAME, AND ELECTRONIC DEVICE

CROSS REFERENCES TO RELATED APPLICATIONS

The present application is a Continuation of application Ser. No. 17/409,065, filed Aug. 23, 2021, which is a Continuation of application Ser. No. 16/927,455 filed Jul. 13, 2020, now U.S. Pat. No. 11,156,886, issued on Oct. 26, 2021, which is a Continuation application of application Ser. No. 16/130,781, filed Sep. 13, 2018, now abandoned, which is a Continuation of application Ser. No. 15/331,361, filed Oct. 21, 2016, now U.S. Pat. No. 10,101,623, issued on Oct. 16, 2018, which is a Continuation of application Ser. No. 14/573,317, filed Dec. 17, 2014, now U.S. Pat. No. 9,500, 897, issued on Nov. 22, 2016, which is a Continuation of application Ser. No. 13/682,875, filed Nov. 21, 2012, now U.S. Pat. No. 8,934,073, issued on Jan. 13, 2015, which claims priority to Japanese Patent Application JP 2012-064162 filed in the Japanese Patent Office on Mar. 21, 2012. The entire contents of these applications are incorporated herein by reference.

BACKGROUND

The present disclosure relates to a display device, a method of manufacturing the display device, and an electronic device that make emission light on a screen generated by external light reflection less visible.

Generally, in a liquid crystal display device, a frame portion (dummy pixel portion) and the top part of a wiring portion within an effective pixel portion are covered with light-shielding layers (each of which is, for example, made of a carbon material, etc.) to prevent external light from being reflected (referred to as black light shielding). Since the material of the light-shielding layer has low resistance, charges enter pixels when all of the light-shielding layers are connected to each other, and the pixels of the effective pixel portion undesirably become bright even when the pixels are in a black display state.

As a technology that suppresses the above-described phenomenon, there is disclosed a technology using crossed Nicols of polarizers (see Japanese Unexamined Patent Application Publication No. 2011-170134). However, the technology is not enough to prevent reflection of external light.

In addition, in order to suppress the charging, the light-shielding layer of the frame portion and the light-shielding layer of the top part of the wiring portion within the effective pixel portion are separated from each other at the outermost peripheral portion within the effective pixel portion.

SUMMARY

In the related art, the quality of an image display is not sufficient even when measures are taken such as employing crossed Nicols and separating the light-shielding layers from each other at the outermost peripheral portion within the effective pixel portion.

In an embodiment of the present disclosure, it is desirable to provide a display device that can display a higher quality image.

According to an embodiment of the present disclosure, there is a provided a display device that includes a display section in which a plurality of pixels are arrayed in a matrix, a plurality of scan lines which select pixels, a plurality of signal lines which supply image signals to the selected pixels, and color filters that are arranged so as to correspond to color displays of the pixels, and the display section includes an effective pixel portion and a frame portion that surrounds the effective pixel portion.

In addition, the frame portion and the wiring circuit of the effective pixel portion are covered with light-shielding layers, the light-shielding layers being separated from each other at a certain separation location in the display section, and a plurality of color filters having different colors are stacked at the separation location.

In addition, according to an embodiment of the present disclosure, there is provided an electronic device that includes the display device according to the above-described embodiment.

According to an embodiment of the present disclosure, there is a provided a method of manufacturing a display device that includes a display section in which a plurality of pixels are arrayed in a matrix, a plurality of scan lines which select pixels, a plurality of signal lines which supply image signals to the selected pixels, and color filters that are arranged so as to correspond to color displays of the pixels, and the method includes covering a frame portion and a wiring circuit of an effective pixel portion in the display section with light-shielding layers and forming the light-shielding layers to be separated from each other at a certain separation location in the display section, and arranging a plurality of color filters having different colors by stacking the color filters at the location at which the light-shielding layers are separated from each other.

In the technology according to the embodiments of the present disclosure, charging can be prevented because the light-shielding layers are separated from each other.

In addition, color filters having different colors are stacked on the portion at which the light-shielding layers are separated from each other and at which there is no light-shielding layer, so that the transmittance of light becomes low and the light reflected from the wiring portion of the substrate can be difficult to be seen even when there is the light reflected from the wiring portion of the substrate due to the incidence of external light.

According to the embodiments of the present disclosure, a phenomenon that the light-shielding portion becomes bright due to charging can be suppressed, and reflection due to external light can be suppressed, thereby realizing a display device that displays a higher quality image.

BRIEF DESCRIPTION OF THE DRAWINGS

FIGS. 1A to 1C are diagrams illustrating a configuration of pixels of a display device according to a first embodiment;

FIGS. 3A to 3F are diagrams illustrating a configuration of pixels and an arrangement of light-shielding layers and color filters in a display device according to a second embodiment;

FIGS. 11A to 11E are diagrams illustrating an electronic device of an application example according to the embodiments.

DETAILED DESCRIPTION OF EMBODIMENTS

The embodiments are described in the following order.
<1. Schematic configuration of a liquid crystal panel>
<2. First embodiment>
<3. Second embodiment>
<4. Third embodiment>
<5. Fourth embodiment>
<6. Fifth embodiment>
<7. Application examples and modifications to an electronic device>

1. Schematic Configuration of a Liquid Crystal Panel

As an example of a display device according to an embodiment, a liquid crystal display device is described. First, a schematic configuration of a liquid crystal panel 30 is described with reference to FIG. 8.

Figure 8:
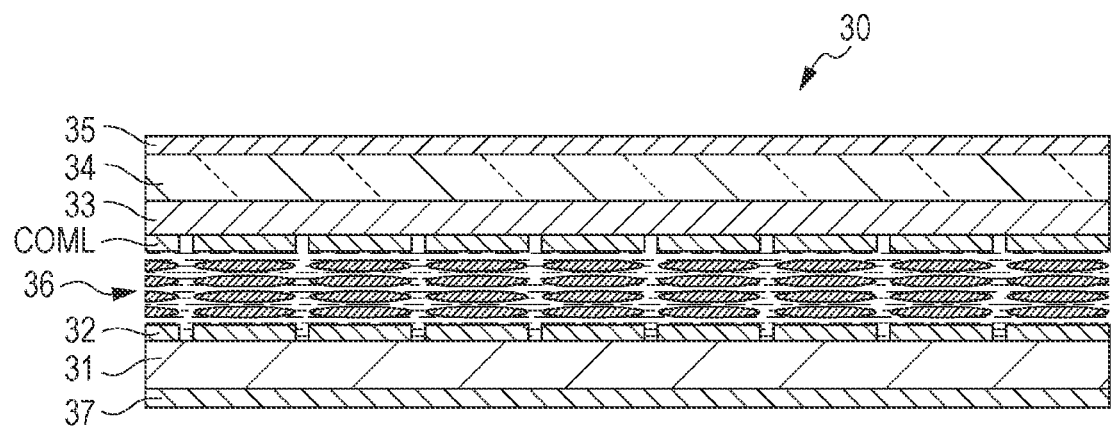
FIG. 8 is a cross-sectional view illustrating a schematic configuration inside a liquid crystal panel.

FIG. 8 is a diagram illustrating an example of the schematic configuration of the cross sectional structure of the liquid crystal panel 30.

As illustrated in FIG. 8, the liquid crystal panel 30 includes a pixel substrate that includes a thin film transistor (TFT) substrate 31 serving as a circuit board, pixel electrodes 32, and a polarizer 37, and a counter substrate that is arranged so as to face the pixel substrate and that includes a glass substrate 34, a color filter 33, drive electrodes COML, and a polarizer 35. The liquid crystal panel 30 includes a liquid crystal layer 36 arranged so as to be inserted between the pixel substrate and the counter substrate.

The pixel substrate includes the TFT substrate 31 serving as a circuit board, a plurality of the pixel electrodes 32 that are disposed in a matrix on the TFT substrate 31, and the polarizer 37 disposed under the TFT substrate 31. In the TFT substrate 31, TFTs of pixels and wiring such as signal lines that supply image signals to the pixel electrodes 32 and signal lines that drive the TFTs are formed (the TFTs and wiring are not illustrated in FIG. 8).

The counter substrate includes the glass substrate 34, the color filter 33 that is formed on one surface of the glass substrate 34, and the plurality of drive electrodes COML that are formed under the color filter 33.

The color filter 33 is configured so that, for example, color filter layers of three colors of red (R), green (G), and blue (B) are repeatedly arrayed, and the three colors of red, green, and blue as a set correspond to respective display pixels.

The drive electrodes COML function as common drive electrodes of the liquid crystal panel 30 and are arranged so that one drive electrode COML corresponds to the two pixel electrodes 32 (the pixel electrodes 32 constitute one line) in the example. The drive electrodes COML are connected to the TFT substrate 31 by contact conductive pillars (not illustrated), and drive signals are applied to the drive electrodes COML from the TFT substrate 31 through the contact conductive pillars. The polarizer 35 is disposed on the other surface of the glass substrate 34.

The liquid crystal layer 36 modulates light that passes through the liquid crystal layer 36 in accordance with the state of an electric field, and for example, liquid crystals having various modes such as twisted nematic (TN), vertical alignment (VA), and electrically controlled birefringence (ECB) may be used for the liquid crystal layer 36.

A light source is used to display an image because the liquid crystal layer 36 itself does not emit light. Generally, the light source is provided on the back surface of the liquid crystal panel 30 opposite to the display surface of the liquid crystal panel 30. Therefore, the light source is referred to as a backlight (not illustrated).

Light from the backlight is directed to the liquid crystal layer 36 from the TFT substrate 31 side while the oscillation direction of the light wave is adjusted by the polarizer 37. The light meets liquid crystal molecules inside the liquid crystal pixels. The alignment of liquid crystal molecules is changed in accordance with an electric field generated by electrodes that are laid around the liquid crystal molecules, and the light is bent and refracted (modulated) under the influence of the alignment direction of the liquid crystal molecules. The polarizer 35 is arranged on the image output side (image display surface side, that is, the user side), and light that enters the liquid crystal layer 36 is not directly output to the image output side, that is, the liquid crystal layer 36 is in a black display state.

However, as described above, the light oscillation direction is changed under the influence of the array direction of the liquid crystal molecules of the liquid crystal layer 36, thereby the light being output from the polarizer 35.

That is, each liquid crystal pixel of the liquid crystal layer 36 performs light and dark display of light from the backlight by controlling the array state of the liquid crystal molecules.

Merely performing light and dark display creates a black and white image, however, by using the color filter 33, color display is performed when red (R) light, green (G) light, and blue (B) light are respectively emitted from a liquid crystal pixel that performs light and dark display and corresponds to a red color filter, a liquid crystal pixel that performs the light and dark display and that corresponds to a green color filter, and a liquid crystal pixel that performs light and dark display and that corresponds to a blue color filter.

In the example, a configuration of three primary color (red, green, and blue) pixels is employed, and alternatively, for example, a white pixel may be employed in addition to the red, green, and blue pixels.

An alignment film is disposed between the liquid crystal layer 36 and the pixel substrate, and the liquid crystal layer 36 and the counter substrate, however, illustration of the alignment film is omitted herein.

The pixel structure is described in detail. The pixels are arrayed in a matrix, and the pixels are formed as liquid crystal pixels in the liquid crystal layer 36.

The TFT substrate 31 includes TFTs, and includes, for example, n-channel metal oxide semiconductor (MOS) TFTs. The source of each transistor of the TFT substrate 31 is connected to an image signal line, the gate of the transistor is connected to a scanning signal line, and the drain of the transistor is connected to one end of a liquid crystal pixel. The other end of the liquid crystal pixel is connected to a drive electrode COML.

Each liquid crystal pixel is connected to another liquid crystal pixel that belongs to the same row as the liquid crystal pixel in the liquid crystal panel 30, through the corresponding scanning signal line. A scanning signal is supplied from a gate driver to the corresponding scanning signal line.

In addition, each liquid crystal pixel is connected to another liquid crystal pixel that belongs to the same column as the liquid crystal pixel in the liquid crystal panel 30, through the corresponding image signal line. Image signals are supplied from a source driver to the corresponding image signal line.

In addition, each liquid crystal pixel is connected to another liquid crystal pixel that belongs to the same row as the liquid crystal pixel in the liquid crystal panel 30, through the drive electrode COML. That is, in the example, a plurality of liquid crystal pixels that belong to the same row share the single drive electrode COML.

In such a configuration, in the liquid crystal panel 30, one horizontal line in the liquid crystal panel 30 is sequentially selected by performing driving so as to sequentially scan the scanning signal lines in a time division manner, and display is performed for each of the horizontal lines by supplying an image signal to liquid crystal pixels that belong to the one horizontal line.

2. First Embodiment

A first embodiment of the present disclosure is described with reference to FIGS. 1A to 2D.

FIG. 1A is a diagram schematically illustrating the front face of a liquid crystal panel 1.

As illustrated in FIG. 1A, in the liquid crystal panel 1, pixels including a red (R) pixel 2, a green (G) pixel 3, and a blue (B) pixel 4 are arranged repeatedly and arrayed in a matrix as a whole. The R pixels 2, the G pixels 3, and the B pixels 4 correspond to the above-described liquid crystal pixels.

A portion in which the R pixels 2, the G pixels 3, and the B pixels 4 are arrayed in a matrix for display is an effective pixel portion. The outside of the portion is a frame portion, and dummy pixels are arrayed in the frame portion. The array of the dummy pixels of the frame portion is similar to that of the effective pixel portion.

As illustrated in FIG. 1A, the frame portion of the liquid crystal panel 1 is covered with a light-shielding layer 5. In addition, an area in which wiring circuit portions (including scan lines, signal lines, TFTs, etc.) are arranged (not illustrated in FIG. 1A) is covered with the light-shielding layer 5 even in the effective pixel portion in which the R pixels 2, the G pixels 3, and the B pixels 4 are arrayed.

The light-shielding layer 5 prevents the reflection of external light and light leakage. The light-shielding layer 5 is formed, for example, of a carbon material.

In this case, the light-shielding layer 5 of the frame portion and the light-shielding layer 5 of the wiring circuit portion are separated from each other at a portion in which a pixel column including the leftmost R pixels 2 is arranged in the effective pixel portion, and a portion in which a pixel column including the rightmost B pixels 4 is arranged in the effective pixel portion.

FIG. 1B is an enlarged diagram of a portion that is surrounded by a dotted line on the left side of the liquid crystal panel 1 in FIG. 1A. The light-shielding layer 5 is indicated by a shaded portion.

As illustrated in FIG. 1B, the light-shielding layer 5 covers the frame portion of the liquid crystal panel 1 and the wiring circuit portion of the effective pixel portion in which the R pixels 2, the G pixels 3, and the B pixels 4 are arrayed. In this case, the light-shielding layer 5 of the frame portion and the light-shielding layer 5 of effective pixel portion are separated from each other at a portion in which a pixel column including the leftmost R pixels 2 is arranged in the effective pixel portion, that is, a portion of the pixel column including the R pixels 2 that is located on the right side of the frame portion and located in close proximity to the frame portion.

The reason why the light-shielding layers 5 are separated from each other is as follows.

A relatively low-resistant carbon material, etc. is used for the light-shielding layer 5, and when the light-shielding layer 5 of the frame portion and the light-shielding layer 5 of the effective pixel portion are connected to each other, charges from outside of the effective pixels enter the pixels, so that the pixels of the effective pixel portion undesirably become bright even in a black display state. Therefore, by separating the light-shielding layers 5, the pixels of the effective pixel portion are prevented from becoming bright due to charging.

At the separation location in FIG. 1B, on a portion that is indicated by being filled-in, a color filter having a color different from a color of the pixel column is stacked.

FIG. 1C is an enlarged diagram of a portion that is enclosed by a dotted line and located on the right side of the liquid crystal panel 1 in FIG. 1A.

As illustrated in FIG. 1C, in the liquid crystal panel 1, the light-shielding layer 5 covers the frame portion and the wiring circuit portion of the effective pixel portion in which the R pixels 2, the G pixels 3, and the B pixels 4 are arrayed. The light-shielding layer 5 of the frame portion and the light-shielding layer 5 of the effective pixel portion are separated from each other at a portion of a pixel column including the B pixels 4 that is located on the left side of the frame portion and located in close proximity to the frame portion.

At the separation location in FIG. 1C, on a portion that is indicated by being filled-in, a color filter having a color different from a color of the pixel column is stacked.

FIGS. 2A to 2D are simplified diagrams illustrating cross sectional structures of the liquid crystal panel 1 in FIGS. 1A to 1C.

Figure 2A:
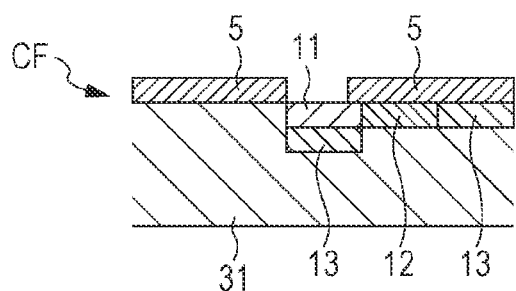
FIGS. 2A to 2D are cross-sectional views illustrating an arrangement of light-shielding layers and color filters in the display device according to the first embodiment.

FIG. 2A is a diagram illustrating the cross section taken along the line IIA-IIA in FIG. 1B.

As illustrated in FIG. 2A, color filters CF are disposed above the TFT substrate 31. A red filter 11, a green filter 12, and a blue filter 13 are arranged from the left side.

The R pixel 2, the G pixel 3, and the B pixel 4, which are not illustrated, are formed between the TFT substrate 31 and the red filter 11, the green filter 12, and the blue filter 13, respectively.

One light-shielding layer 5 covers the green filter 12 and the blue filter 13. The covered portion is located between rows of pixels and is a portion in which a pixel circuit or scan lines are arranged. Another light-shielding layer 5 covers the frame portion. In addition, the light-shielding layers 5 are separated from each other at the red filter 11 (that is, the portion of FIG. 1B that is indicated by being filled-in).

The blue filter 13, which has a color different from red, is stacked on the red filter 11. In this case, any color filter may be stacked on the red filter 11 as long as the color filter has a color other than red.

Figure 2B:
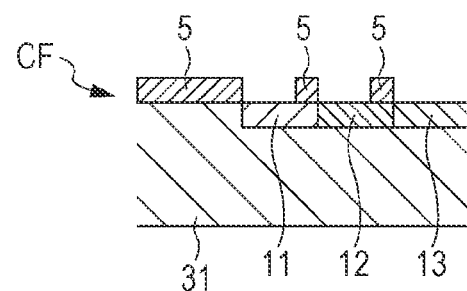

FIG. 2B is a diagram illustrating the cross section taken along the line IIB-IIB in FIG. 1B.

As illustrated in FIG. 2B, the color filters CF are disposed above the TFT substrate 31. The red filter 11, the green filter 12, and the blue filter 13 are arranged from the left side.

The light-shielding layer 5 covers the frame portion and the wiring of signal lines in the effective pixel portion.

The reason why the red filter 11 and the blue filter 13 are stacked at the separation location of the light-shielding layers 5 as illustrated in FIG. 2A is as follows.

When the light-shielding layers 5 are separated from each other in order to prevent charging as described above, light reflection due to external light occurs at a portion in which the light-shielding layer 5 is not provided (wiring circuit portion between the R pixels 2 arranged in the vertical direction in FIGS. 1A to 1C). When the external light reflection occurs at each space between the R pixels 2 arranged in the vertical direction, a single vertical red line (reflection emission spectrum) is visually recognized on the left side of the display screen undesirably, so that the screen quality is reduced.

Therefore, in order to prevent such a reflection emission spectrum from being visually recognized, the transmittance is reduced by stacking a color filter having a color other than red on the red filter 11 at the portion, thereby preventing reflection emission spectrum due to the reflection of the wiring circuit portion from being visually recognized.

The green filter 12 may be stacked on the red filter 11, however, the blue filter 13 is more effective in reducing the transmittance when the blue filter 13 is stacked on the red filter 11.

Figure 2C:
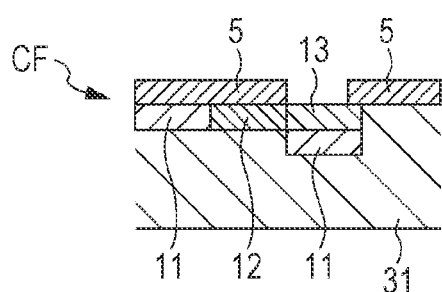

FIG. 2C is a diagram illustrating the cross section taken along the line IIC-IIC in FIG. 1C.

As illustrated in FIG. 2C, the color filters CF are disposed above the TFT substrate 31. The red filter 11, the green filter 12, and the blue filter 13 are arranged from the left side. The R pixel 2, the G pixel 3, and the B pixel 4, which are not illustrated, are formed between the TFT substrate 31 and the red filter 11, the green filter 12, and the blue filter 13, respectively.

One light-shielding layer 5 covers the red filter 11 and the green filter 12. The covered portion is located between rows of pixels and is a portion in which a pixel circuit or scan lines are arranged. Another light-shielding layer 5 covers the frame portion. In addition, the light-shielding layers 5 are separated from each other at the blue filter 13 (that is, the portion of FIG. 1C that is indicated by being filled-in).

The red filter 11, which has a color different from blue, is stacked on the blue filter 13. In this case, any color filter may be stacked on the blue filter 13 as long as the color filter has a color other than blue.

Figure 2D:
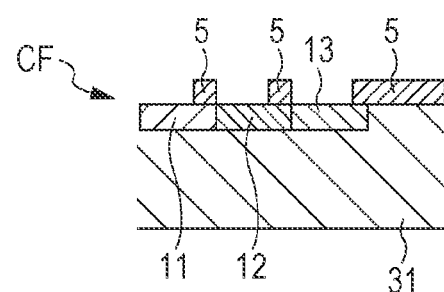

FIG. 2D is a diagram illustrating the cross section taken along the line IID-IID in FIG. 10.

As illustrated in FIG. 2D, the color filters CF are disposed above the TFT substrate 31. The red filter 11, the green filter 12, and the blue filter 13 are arranged from the left side.

The light-shielding layer 5 covers the frame portion and the wiring of signal lines in the effective pixel portion.

The reason why the blue filter 13 and the red filter 11 are stacked at the separation location of the light-shielding layers 5 as illustrated in FIG. 2C is the same reason as for FIG. 2A. That is, the transmittance is reduced by stacking a color filter having a color other than blue on the blue filter 13 at the portion, thereby preventing reflection emission spectrum due to reflection of the wiring circuit portion from being visually recognized.

In this case, external light emission light that occurs at the wiring portion of the blue filter 13, that is on the right side of the display screen becomes a blue line, and the blue line is less obvious. However, in this case, the external light emission light is made to be less obvious by arranging and stacking a color filter on the blue filter 13.

The configuration according to the first embodiment is described above. In the configuration, a phenomenon can be suppressed that the light-shielding portion becomes bright due to charging and that the external light reflection emission spectrum is visually recognized. As a result, a display device that can display a higher quality image is realized.

3. Second Embodiment

A second embodiment of the present disclosure is described with reference to FIGS. 3A to 3F.

In the first embodiment, the light-shielding layers 5 are separated from each other at a portion in which a pixel column including the leftmost R pixels 2 is arranged in the effective pixel portion or a portion in a pixel column including the rightmost B pixels 4 is arranged in the effective pixel portion.

On the contrary, in the second embodiment, the light-shielding layers 5 are separated from each other at dummy pixel portions of the frame portions located on the right and left sides.

The same reference numerals are given to portions that are similar to the above-described portions, and the description thereof is omitted.

FIGS. 3A and 3B are diagrams illustrating the detailed configuration of the second embodiment and corresponding to FIGS. 1B and 1C. First, the description is made with reference to FIG. 3A.

FIG. 3A is an enlarged diagram of the left end portion of the liquid crystal panel 1.

As illustrated in FIG. 3A, the light-shielding layer 5 covers the frame portion, and covers a space between the rows of the arranged R pixels 2, G pixels 3, and B pixels 4 included in the effective pixel portion. The light-shielding layers 5 are separated from each other at the dummy pixel portion on the left side of the frame portion (that is, the portion that is indicated by being filled-in).

FIG. 3C is a diagram illustrating the cross section taken along the line IIIC-IIIC in FIG. 3A.

As illustrated in FIG. 3C, the color filters CF are disposed above the TFT substrate 31. The blue filter 13, the red filter 11, the green filter 12, and the blue filter 13 are arranged from the left side. The red filter 11 is stacked on the leftmost blue filter 13. The stacked portion is the dummy pixel portion of the frame portion. The other color filters are included in the effective pixel portion.

The light-shielding layer 5 covers the frame portion on the left side of the liquid crystal panel. In addition, the light-shielding layer 5 is not provided on the leftmost blue filter 13 in the space between the rows of the arranged pixels because the light-shielding layers 5 are separated from each other at the dummy pixel portion on the right side of the frame portion. The light-shielding layer 5 is also provided on the wiring of signal lines in the effective pixel portion.

As described above, the red filter 11 having a color different from the blue filter 13 is stacked on the blue filter 13 that is included in the frame portion and includes the dummy pixels on the right side of the frame portion. Any color filter may be stacked on the blue filter 13 as long as the color filter has a color other than blue.

The R pixel 2, the G pixel 3, and the B pixel 4, which are not illustrated, are formed between the TFT substrate 31 and the color filters CF, respectively.

FIG. 3D is a diagram illustrating the cross section taken along the line IIID-IIID in FIG. 3A.

As illustrated in FIG. 3D, the color filters CF are disposed above the TFT substrate 31. The blue filter 13, the red filter 11, the green filter 12, and the blue filter 13 are arranged from the left side. The red filter 11 is stacked on the leftmost blue filter 13. The stacked portion is the dummy pixel portion of the frame portion. The other color filters are included in the effective pixel portion.

The R pixel 2, the G pixel 3, and the B pixel 4, which are not illustrated, are formed between the TFT substrate 31 and the color filters CF, respectively.

One light-shielding layer 5 covers the red filter 11, the green filter 12, and the blue filter 13. The covered portion is located between the rows of the pixels, is a portion in which a pixel circuit or scan lines are arranged, and is a portion of effective pixels. In addition, another light-shielding layer 5 covers the frame portion. In addition, the light-shielding layers 5 are separated from each other at the blue filter 13 of the frame portion in close proximity to the effective pixel portion. The red filter 11 having a color different from blue is stacked on the blue filter 13. In this case, any color filter may be stacked on the blue filter 13 as long as the color filter has a color other than blue.

Charging is suppressed by separating the light-shielding layers 5, and the transmittance is reduced by stacking a color filter having a color different from the blue filter 13 on the separation location, thereby suppressing the reflection of external light and reflection emission spectrum.

As described above, FIG. 3B is a diagram corresponding to FIG. 10. That is, FIG. 3B is an enlarged diagram of the right end portion of the liquid crystal panel 1.

As illustrated in FIG. 3B, the light-shielding layer 5 covers (a space) between the rows of the arranged R pixels 2, G pixels 3, and B pixels 4. The light-shielding layers 5 are separated from each other at the dummy pixel portion on the right side of the frame portion (that is, the portion that is indicated by being filled-in).

FIG. 3E is a diagram illustrating the cross section taken along the line IIIE-IIIE in FIG. 3B.

As illustrated in FIG. 3E, the color filters CF are disposed above the TFT substrate 31. The red filter 11, the green filter 12, the blue filter 13, and the red filter 11 are arranged from the left side. The blue filter 13 is stacked on the rightmost red filter 11. The stacked portion is the dummy pixel portion of the frame portion. The other color filters are included in the effective pixel portion.

The light-shielding layer 5 covers the frame portion on the right side of the liquid crystal panel 1. In addition, the light-shielding layer 5 is not provided on the rightmost red filter 11 in the space between the rows of the arranged pixels because the light-shielding layers 5 are separated from each other at the dummy pixel portion on the left side of the frame portion. The light-shielding layer 5 is also provided on the wiring of signal lines in the effective pixel portion.

As described above, the blue filter 13 having a color different from the red filter 11 is stacked on the red filter 11 that is included in the frame portion and includes the dummy pixels on the left side of the frame portion. Any color filter may be stacked on the red filter 11 as long as the color filter has a color other than red.

The R pixel 2, the G pixel 3, and the B pixel 4, which are not illustrated, are formed between the TFT substrate 31 and the color filters CF, respectively.

FIG. 3F is a diagram illustrating the cross section taken along the line IIIF-IIIF in FIG. 3B.

As illustrated in FIG. 3F, the color filters CF are disposed above the TFT substrate 31. The red filter 11, the green filter 12, the blue filter 13, and the red filter 11 are arranged from the left side. The blue filter 13 is stacked on the rightmost red filter 11. The portion is the dummy pixel portion of the frame portion. The other color filters are included in the effective pixel portion.

The R pixel 2, the G pixel 3, and the B pixel 4, which are not illustrated, are formed between the TFT substrate 31 and the color filters CF, respectively.

One light-shielding layer 5 covers the red filter 11, the green filter 12, and the blue filter 13. The covered portion is located between the rows of the pixels, is a portion in which a pixel circuit or scan lines are arranged, and is a portion of effective pixels. In addition, another light-shielding layer 5 covers the frame portion. In addition, the light-shielding layers 5 are separated from each other at the red filter 11 of the frame portion in close proximity to the effective pixel portion. The blue filter 13 having a color different from red is stacked on the red filter 11. In this case, any color filter may be stacked on the red filter 11 as long as the color filter has a color other than red.

Charging is suppressed by separating the light-shielding layers 5, and the transmittance is reduced by stacking a color filter having a color different from the red filter 11 on the separation location, thereby suppressing the reflection of external light and reflection emission spectrum.

With the above-described configuration, a phenomenon that the light-shielding portion becomes bright due to the charging may be suppressed, and reflection due to external light may be suppressed, thereby realizing a display device that can display a higher quality image.

In the first embodiment, in the charging, the red and blue pixels that emit light are visually recognized. On the other hand, in the second embodiment, because the color filter CF having a color different from the color of the pixel of the separation location is stacked on the pixel of the separation location of the frame portion, emission light is difficult to be visually recognized as compared with the first embodiment even when the pixel emits light in the charging.

4. Third Embodiment

A third embodiment of the present disclosure is described with reference to FIGS. 4A to 4D.

In the third embodiment, the liquid crystal panel 10 in which white (W) pixels are added to the pixels of the liquid crystal panel is regarded as a target. In the first embodiment, in order to prevent the reflection of external light, the light-shielding layer 5 covers the frame portion and a space between the rows of the pixels in the effective pixel portion, and the wiring of signal lines. In addition, the light-shielding layers 5 are separated from each other at the leftmost R pixel 2 portion and the rightmost B pixel 4 portion in the effective pixel portion. In the third embodiment, the light-shielding layers 5 are separated from each other at the pixel portion of the B pixels 4 that are included in the second column from the right side of the effective pixel portion.

A color filter having a color different from the B pixels of the pixel column is stacked at the separation location.

The same reference numerals are given to portions that are similar to the above-described portions, and the description thereof is omitted.

Figure 4A:
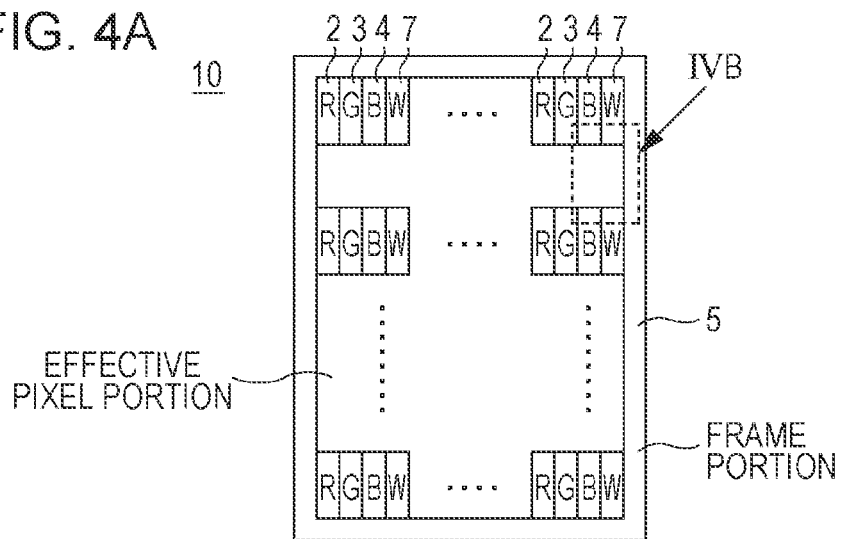
FIGS. 4A to 4D are diagrams illustrating a configuration of pixels and an arrangement of light-shielding layers and color filters in a display device according to a third embodiment.

FIG. 4A is a schematic diagram illustrating the front face of the liquid crystal panel 10.

As illustrated in FIG. 4A, in the liquid crystal panel 10, the pixels of the R pixel 2, the G pixel 3, the B pixel 4, and a W pixel 7 are arranged repeatedly, and arrayed in a matrix as a whole.

Each of the R pixel 2, the G pixel 3, the B pixel 4, and the W pixel 7 corresponds to a liquid crystal pixel.

A portion in which the R pixels 2, the G pixels 3, the B pixels 4, and the W pixels 7 are arrayed in a matrix for display is an effective pixel portion. The outside of the effective pixel portion is a frame portion in which dummy pixels are arrayed. The order of array of the dummy pixels in the frame portion is similar to the order of array in the effective pixel portion.

In the first embodiment, the light-shielding layers 5 are separated from each other at the portion in which the pixel column of the leftmost R pixels 2 of the effective pixel portion is arranged and at the portion in which the pixel column of the rightmost B pixel 4 is arranged.

On the other hand, in the third embodiment, the light-shielding layers 5 are separated from each other at the pixel column of the B pixels 4 at the left side of the pixel column of the rightmost W pixels 7, because the wiring reflection of the pixel portion of the W pixels 7 becomes obvious undesirably when the light-shielding layers 5 are separated from each other at the pixel portion of the W pixels 7.

Figure 4B:
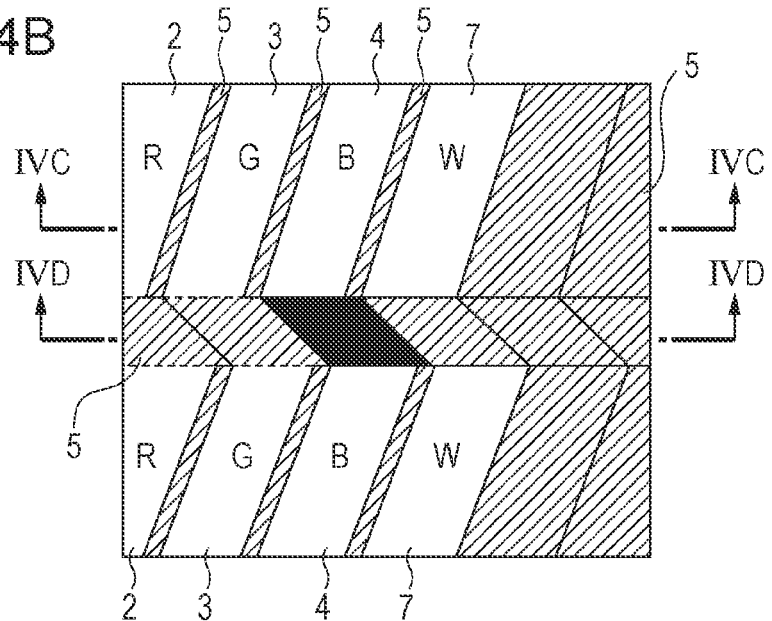

FIG. 4B is an enlarged diagram of a portion enclosed by the dotted line of FIG. 4A.

As illustrated in FIG. 4B, the light-shielding layer 5 covers the frame portion of the liquid crystal panel 10, and covers a space between the rows of the arranged pixels of the R pixels 2, the G pixels 3, the B pixels 4, and the W pixels 7. The light-shielding layers 5 are separated from each other at the portion of the pixel column of the B pixels 4 on the left side of the pixel column of the rightmost W pixels 7 in the effective pixel portion (that is, the portion that is indicated by being filled-in). By separating the light-shielding layers 5 at the portion, the reflection of wiring in the W pixel 7 portion can be prevented.

A color filter having a color different from the B pixels of the pixel column is stacked at the separation location. The cross sectional structures are illustrated in FIGS. 4C and 4D.

Figure 4C:
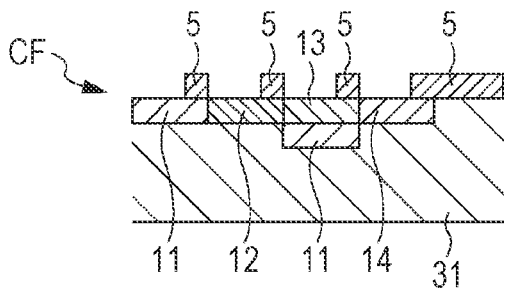
Figure 4D:
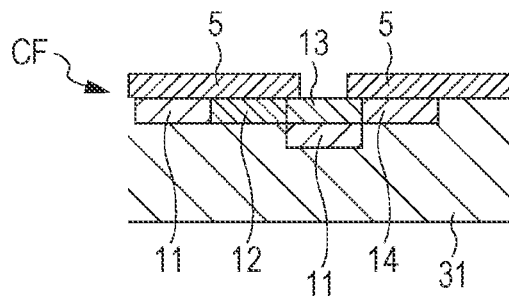

FIG. 4C is a schematic diagram illustrating the cross sectional structure taken along the line IVC-IVC of the liquid crystal panel 10 in FIG. 4B.

As illustrated in FIG. 4C, the color filters CF are disposed above the TFT substrate 31. The red filter 11, the green filter 12, the blue filter 13, and a white filter 14 are arranged from the left side.

The R pixel 2, the G pixel 3, the B pixel 4, and the W pixel 7, which are not illustrated, are formed between the TFT substrate 31 and the color filters CF, respectively. The red filter 11 is stacked on the blue filter 13. The light-shielding layer 5 covers the frame portion. The IVC-IVC portion is not located at a space between the rows of the pixels, and the light-shielding layer 5 is formed on the wiring of signal lines.

FIG. 4D is a diagram illustrating the cross sectional structure taken along the line IVD-IVD in FIG. 4B.

As illustrated in FIG. 4D, the color filters CF are disposed above the TFT substrate 31. The red filter 11, the green filter 12, the blue filter 13, and the white filter 14 are arranged from the left side. The red filter 11 is stacked on the blue filter 13 on the left side of the rightmost white filter 14.

The R pixel 2, the G pixel 3, the B pixel 4, and the W pixel 7, which are not illustrated, are formed between the TFT substrate 31 and the color filters CF, respectively.

The IVD-IVD portion is located at the space between the rows of the pixels. Thus, the light-shielding layer 5 is formed on a wiring circuit portion such as scan lines and a pixel circuit portion, and covers the red filter 11 and the green filter 12. In addition, the light-shielding layer 5 covers the white filter 14 and the frame portion. In addition, the light-shielding layers 5 are separated from each other at the blue filter 13 on the left side of the rightmost white filter 14 in the effective pixel portion. The red filter 11 having a color different from blue is stacked on the blue filter 13. In this case, any color filter may be stacked on the blue filter 13 as long as the color filter has a color other than blue.

Charging is suppressed by separating the light-shielding layers 5, and the transmittance is reduced by stacking a color filter having a color different from the blue filter 13 on the separation location, thereby suppressing the reflection of the wiring due to external light.

With the above-described a configuration, a display device that can display a higher quality image is realized.

5. Fourth Embodiment

A fourth embodiment of the present disclosure is described with reference to FIGS. 5A to 5C.

In the fourth embodiment, the liquid crystal panel 10 in which the W pixels 7 are added to the pixels of the liquid crystal panel is regarded as a target. In the second embodiment, the light-shielding layers 5 are separated from each other at the dummy pixel portions of the frame portions on the left and right sides of the liquid crystal panel. In the fourth embodiment, the light-shielding layers 5 are separated from each other at the red dummy pixel portion of the frame portion on the right side of the liquid crystal panel in close proximity to the effective pixel portion.

The same reference numerals are given to portions that are similar to the above-described portions, and the description thereof is omitted.

Figure 5A:
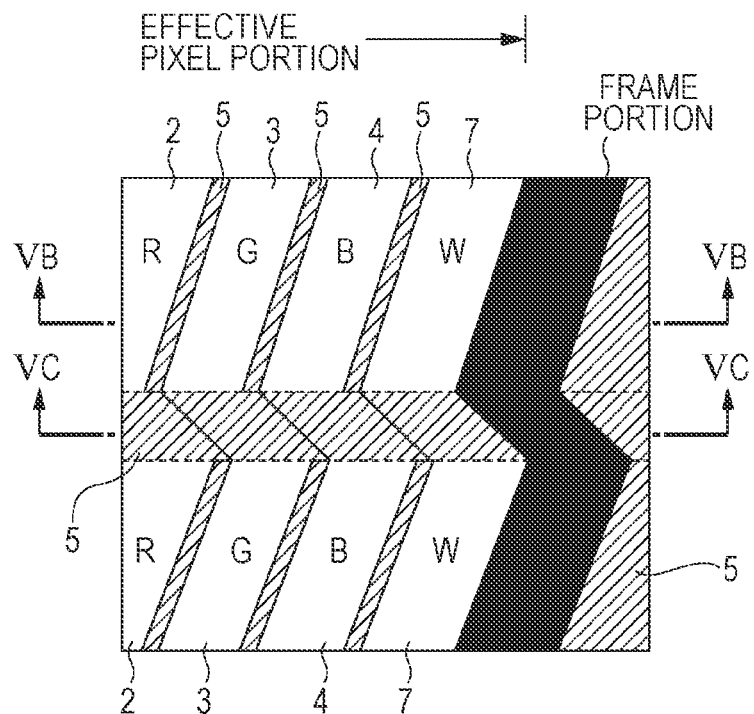
FIGS. 5A to 5C are diagrams illustrating a configuration of pixels and an arrangement of light-shielding layers and color filters in a display device according to a fourth embodiment.

FIG. 5A is a diagram illustrating the detailed configuration of the fourth embodiment and corresponding to the diagrams of FIG. 4B.

As illustrated in FIG. 5A, the light-shielding layer 5 covers a space between the rows of the arranged pixels of the R pixels 2, the G pixels 3, the B pixels 4, and the W pixels 7. The light-shielding layers 5 are separated from each other at the dummy pixel portion of the frame portion on the right side of the liquid crystal panel (that is, the portion that is indicated by being filled-in).

Figure 5B:
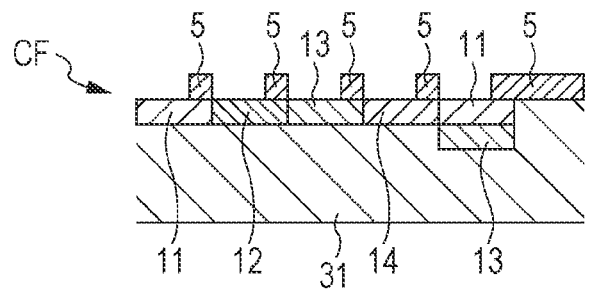

FIG. 5B is a diagram illustrating the cross sectional structure taken along the line VB-VB in FIG. 5A. As illustrated in FIG. 5B, the color filters CF are disposed above the TFT substrate 31. The red filter 11, the green filter 12, the blue filter 13, the white filter 14, and the red filter 11 are arranged from the left side. The blue filter 13 having a color different from the red filter 11 is stacked on the rightmost red filter 11. The stacked portion is the dummy pixel portion of the frame portion. The other color filters are included in the effective pixel portion. Any color filter may be stacked on the rightmost red filter 11 as long as the color filter has a color other than red.

The light-shielding layer 5 covers the frame portion on the right side of the liquid crystal panel. In addition, the light-shielding layer 5 is formed merely on the wiring of signal lines because the VB-VB portion is not located at a space between the rows of the pixels. The R pixel 2, the G pixel 3, the B pixel 4, and the W pixel 7, which are not illustrated, are formed between the TFT substrate 31 and the color filters CF, respectively. The blue filter 13 having a color different from the red filter 11 is stacked at the separation location. Any color filter may be stacked on the rightmost red filter 11 as long as the color filter has a color other than red.

Figure 5C:
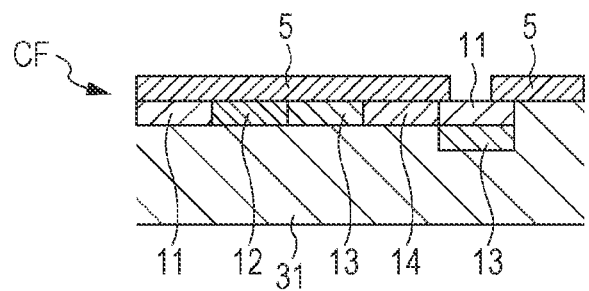

FIG. 5C is diagram illustrating the cross sectional structure taken along the line VC-VC in FIG. 5A.

As illustrated in FIG. 5C, the color filters CF are disposed above the TFT substrate 31. The red filter 11, the green filter 12, the blue filter 13, the white filter 14, and the red filter 11 are arranged from the left side. The blue filter 13 having a color different from the red filter 11 is stacked on the rightmost red filter 11. The stacked portion is the dummy pixel portion in the frame portion. The other color filters are included in the effective pixel portion. Any color filter may be stacked on the rightmost red filter 11 as long as the color filter has a color other than red.

The R pixel 2, the G pixel 3, the B pixel 4, and the W pixel 7, which are not illustrated, are formed between the TFT substrate 31 and the color filters CF, respectively.

The VC-VC portion is located at the space between the rows of the pixel. Thus, the light-shielding layer 5 is formed on a wiring circuit portion such as scan lines and a pixel circuit portion, and covers the red filter 11, the green filter 12, the blue filter 13, and the white filter 14. In addition, the covered portion is the effective pixel portion. In addition, the light-shielding layers 5 are separated from each other at the red filter 11 of the frame portion in close proximity to the effective pixel portion. In addition, the light-shielding layer 5 covers the frame portion outside the effective pixel portion. The blue filter 13 having a color different from red is stacked on the rightmost red filter 11. In this case, any color filter may be stacked on the rightmost red filter 11 as long as the color filter has a color other than red.

With the above-described configuration, in the liquid crystal panel 10 in which the W pixels 7 are added to the pixels, a phenomenon can be suppressed that the light-shielding portion becomes bright when the W pixels 7 emit light due to the charging. As a result, a display device that can display a high quality image is realized. In addition, the yield of the liquid crystal panel can be improved.

6. Fifth Embodiment

A fifth embodiment of the present disclosure is described with reference to FIGS. 6A to 6D.

Figure 6A:
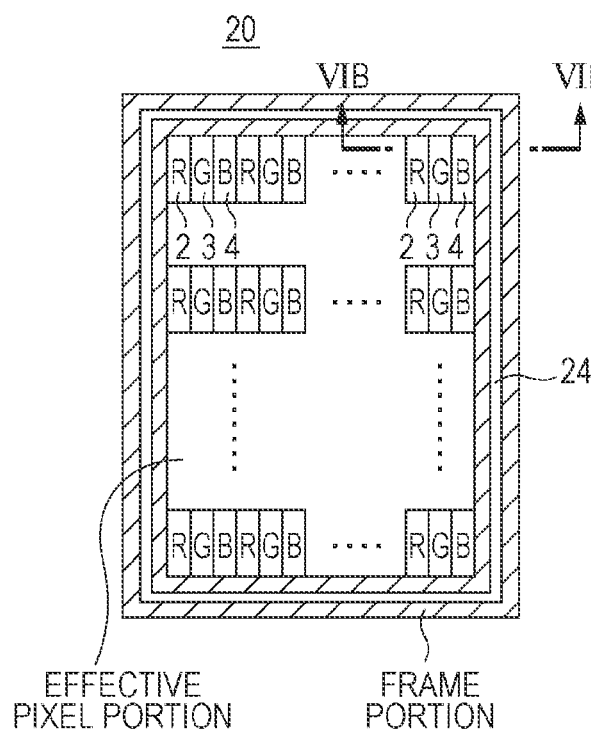
FIGS. 6A to 6D are diagrams illustrating a configuration of pixels and an arrangement of light-shielding layers and color filters in a display device according to a fifth embodiment.

FIG. 6A is a schematic diagram illustrating the front face of a liquid crystal panel 20. A cover plate 21 is mounted on the liquid crystal panel 20. FIG. 6C illustrates the external appearance of the cover plate 21. FIG. 6D illustrates the external appearance in a state in which the cover plate 21 is mounted on the liquid crystal panel 20.

The same reference numerals are given to portions that are similar to the above-described portions, and the description thereof is omitted.

As illustrated in FIG. 6A, in the liquid crystal panel 20, the pixels of the R pixel 2, the G pixel 3, and the B pixel 4 are repeatedly arranged and arrayed in a matrix as a whole. Each of the pixels of the R pixel 2, the G pixel 3, and the B pixel 4 corresponds to the above-described liquid crystal pixel.

A portion in which the R pixels 2, the G pixels 3, and the B pixels 4 are arrayed in a matrix for display is an effective pixel portion. The outside of the effective pixel portion is a frame portion in which dummy pixels are arrayed. The array of the dummy pixels in the frame portion is similar to the array in the effective pixel portion.

In the fifth embodiment, the separation location of the light-shielding layers 5 that cover the frame portion is located at the frame portion of the liquid crystal panel 20, and the light-shielding layers 5 are separated from each other so as to be formed into the shapes of the hollow squares at a separation section 24.

Figure 6B:
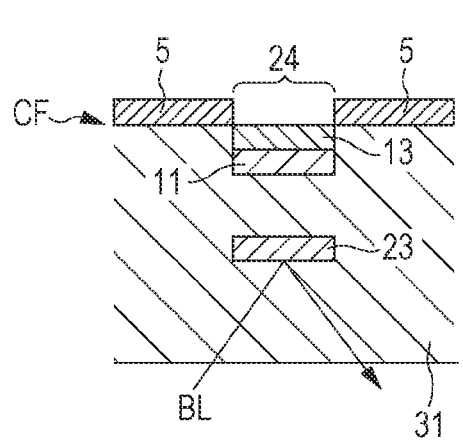
Figure 6C:
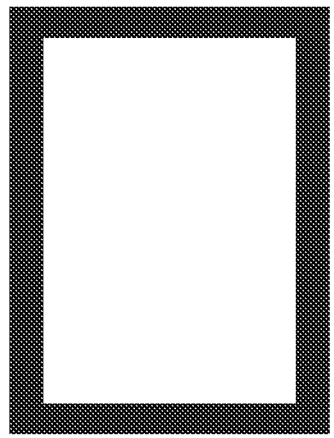
Figure 6D:
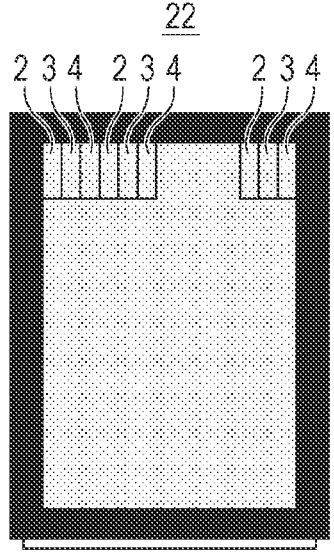

FIG. 6B is a diagram illustrating the cross section taken along the line VIB-VIB in FIG. 6A.

As illustrated in FIG. 6B, the light-shielding layers 5 cover the frame portion and are separated from each other at the separation section 24.

For example, a blue filter is stacked on the separation section 24. As a result, the wiring reflection of external light can be prevented. In addition, the blue filter and a red filter may be stacked on the separation section 24 as a whole by adding the red filter on the separation section 24. As a result, the wiring reflection can be further reduced.

In addition, a light-shielding metal 23 is arranged below the separation section 24. As a result, light from the backlight is prevented from being output from the separation section 24.

The R pixel 2, the G pixel 3, and the B pixel 4, which are not illustrated, are formed between the TFT substrate 31 and the color filters CF, respectively.

FIG. 6C is a diagram illustrating the external appearance of the cover plate 21 to be mounted on the liquid crystal panel 20. When the cover plate 21 is mounted on the liquid crystal panel 20, the frame portion of the liquid crystal panel 20 is covered with the cover plate 21. Thus, when the light transmittance of the cover plate 21 that corresponds to the frame portion of the liquid crystal panel 20 is low, the above-described stack of the red filter 11, the blue filter 13, etc. on the separation section 24 may be omitted.

FIG. 6D is a diagram illustrating the external appearance in a state 22 in which the cover plate 21 is mounted on the liquid crystal panel 20. FIG. 6D illustrates the state of the liquid crystal panel 20 being used. The separation section 24 is not visually recognized due to the frame portion of the cover plate 21.

Next, two modifications according to the fifth embodiment of the present disclosure are described with reference to FIGS. 7A to 7D.

Figure 7A:
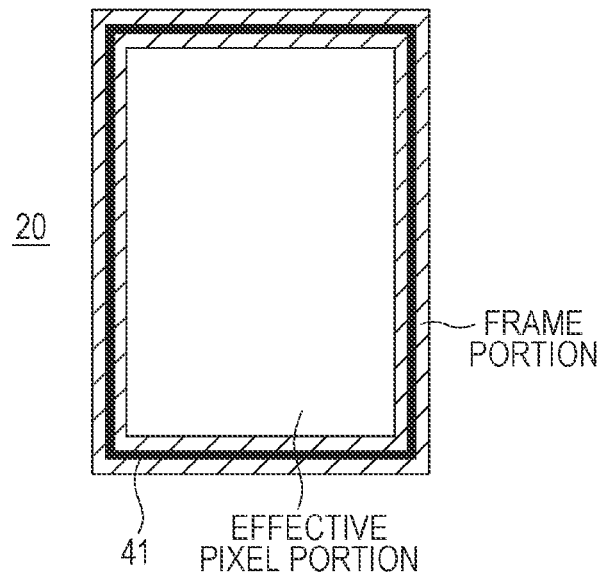
FIGS. 7A to 7D are diagrams illustrating a modification according to the fifth embodiment.
Figure 7B:
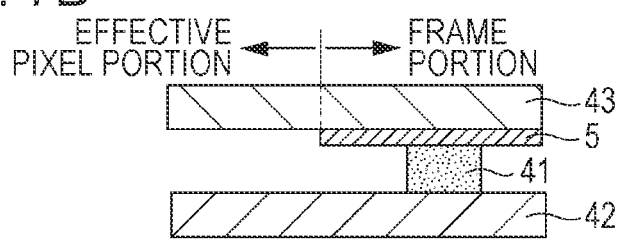

FIG. 7A illustrates a location to which a seal material 41 is applied in the liquid crystal panel 20. The seal material 41 is an adhesive agent that bonds a pixel substrate 42 formed of the TFT substrate 31 or the like and a counter substrate 43 formed of the color filter 33 or the like. As illustrated in FIG. 7A, the seal material 41 is applied to the frame portion and bonds the two substrates. FIG. 7B illustrates the cross sectional structure of the location.

As illustrated in FIG. 7B, the pixel substrate 42 and the counter substrate 43 are bonded to each other by the seal material 41 of the frame portion. In addition, generally, the light-shielding layer 5 is formed over the whole surface of the frame portion. In this state, it is probable that external charges enter pixels from the right end of the liquid crystal panel, and the frame portion may become bright undesirably even when the frame portion is in the black display state, because the light-shielding layer 5 is low resistant.

Figure 7C:
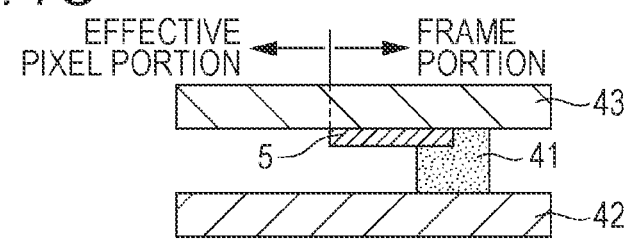

FIG. 7C illustrates one modification of the fifth embodiment. As illustrated in FIG. 7C, in the modification, the light-shielding layers 5 is removed along the frame portion from the end of the liquid crystal panel 20 to the portion of the seal material so that the removed shape becomes the hollow square. In addition, the remaining light-shielding layer 5 is isolated from the outside so that the seal material 41 seals the light-shielding layer 5. As a result, the entering of charges from the outside is prevented, because the seal material is an insulator, thereby preventing the screen from becoming bright.

Figure 7D:
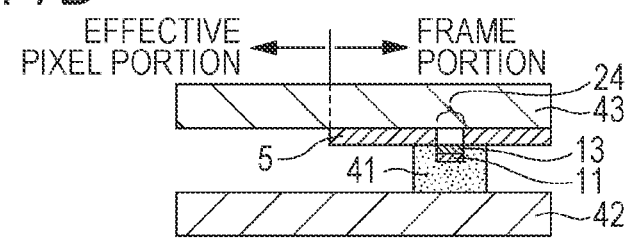

FIG. 7D illustrates another modification of the fifth embodiment. As illustrated in FIG. 7D, the light-shielding layers 5 are separated from each other so as to be formed into the shapes of the hollow square at the portion of the seal material 41 along the frame portion. In addition, the blue filter 13 and the red filter 11 are stacked at the separation location 24. The entering of charges from the outside and the light leakage from the end of the liquid crystal panel 20 are prevented desirably, because the separation location of the light-shielding layer 5 is in the portion of the seal material 41, and the wiring reflection of external light can be prevented desirably.

With the above-described configurations, a phenomenon that the light-shielding portion becomes bright due to the charging can be suppressed, and reflection due to external light can be suppressed. In addition, transmission of light of backlight to the outside can be suppressed. As a result, a display device that can display a higher quality image is realized.

7. Application Examples and Modifications to an Electronic Device

The embodiments are as described above. The configuration of the liquid crystal display device is an example, and the configuration of the pixels is also an example. The technology according to the embodiments of the present disclosure may be applied to device configurations used for various liquid crystal display devices.

In addition, the embodiments of the present disclosure may be widely applied to various display devices in addition to the liquid crystal display devices.

Next, application examples of the liquid crystal display device described in the embodiments are described with reference to FIGS. 9A to 11E. The liquid crystal display device according to the embodiments may be applied to an electronic device in any field, such as a television device, a digital camera, a laptop type personal computer, a mobile terminal device including a mobile phone, or a camcorder, that displays image signals input from the outside or image signals generated in the electronic device, as an image or video.

First Application Example

Figure 9A:
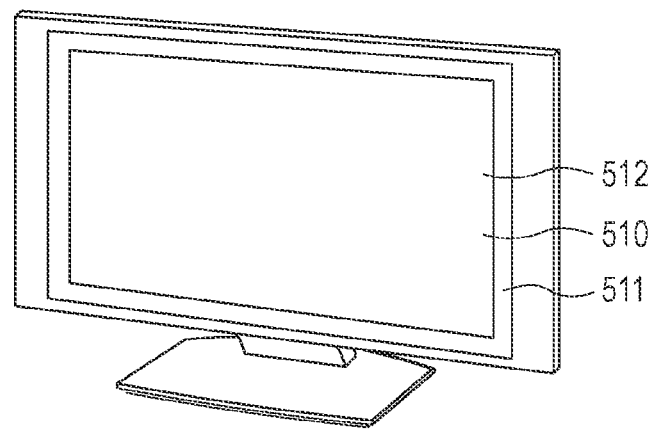
FIGS. 9A to 9C are diagrams each illustrating an electronic device of an application example according to the embodiments.

FIG. 9A is a diagram illustrating the external appearance of a television device to which the liquid crystal display device according to the embodiments is applied. The television device includes, for example, an image display screen section 510 including a front panel 511 and a filter glass 512, and the image display screen section 510 is formed of the liquid crystal display device according to the embodiments.

Second Application Example

Figure 9B:
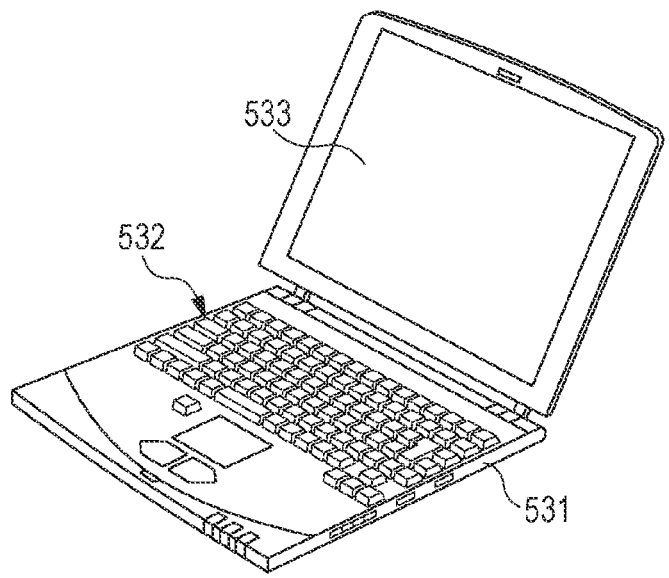

FIG. 9B is a diagram illustrating the external appearance of a laptop type personal computer to which the liquid crystal display device according to the embodiments is applied. The laptop type personal computer includes, for example, a body 531, and a keyboard 532 that is used for an input operation of characters, etc., and a display section 533 that displays an image, and the display section 533 is formed of the liquid crystal display device according to the embodiments.

Third Application Example

Figure 9C:
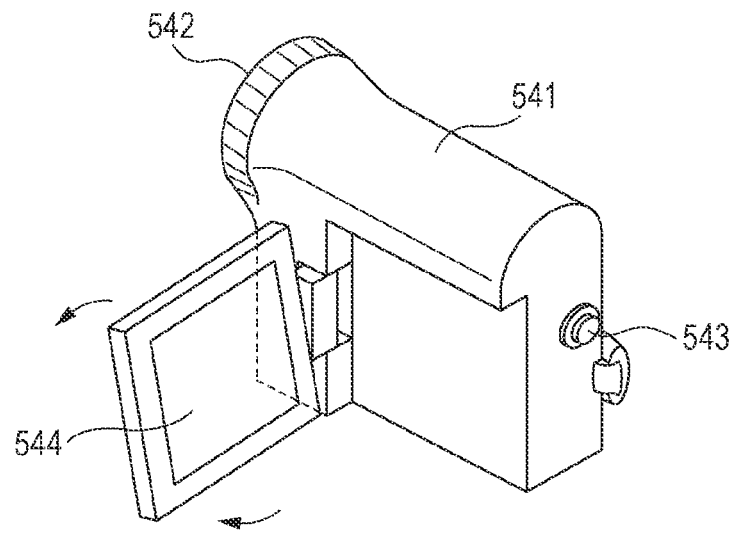

FIG. 9C is a diagram illustrating the external appearance of a camcorder to which the liquid crystal display device according to the embodiments is applied. The camcorder includes, for example, a body unit 541, a lens 542 that captures an object image and is provided on the front side surface of the body unit 541, a start/stop switch 543 in the image capturing, and a display section 544, and the display section 544 is formed of the liquid crystal display device according to the embodiments.

Fourth Application Example

Figure 10A:
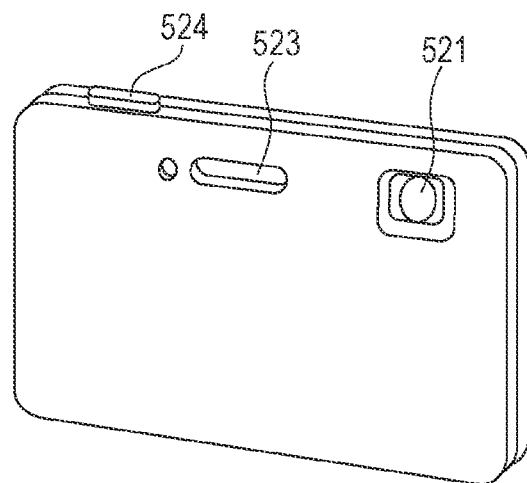
FIGS. 10A and 10B are diagrams illustrating an electronic device of an application example according to the embodiments.
Figure 10B:
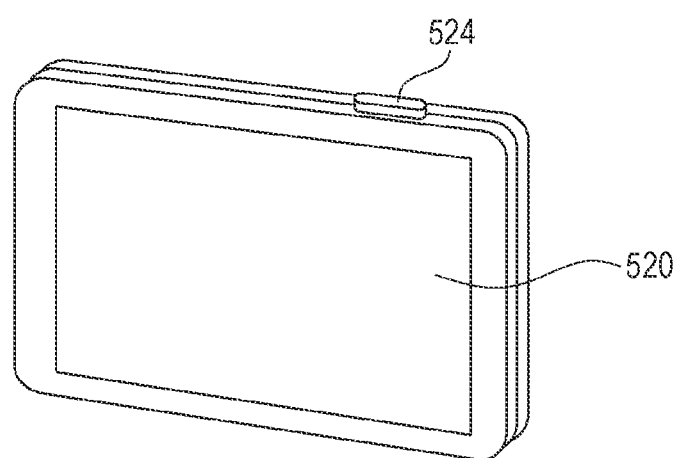

FIGS. 10A and 10B are diagrams illustrating the external appearance of a digital camera to which the liquid crystal display device according to the embodiments is applied. FIG. 10A illustrates the front side of the external appearance of the digital camera, and FIG. 10B illustrates the back side of the external appearance of the digital camera. The digital camera includes, for example, a display section 520 with a touch-screen, an imaging lens 521, a light emitting section for flash 523, and a shutter button 524, and the display section 520 is formed of the liquid crystal display device according to the embodiments.

Fifth Application Example

FIGS. 11A to 11E are diagrams illustrating the external appearance of a mobile phone to which the liquid crystal display device according to the embodiments is applied. FIG. 11A illustrates the operation surface and the display surface of the external appearance of the mobile phone in a state in which the housing is open. FIG. 11B illustrates the top surface side of the external appearance of the mobile phone in a state in which the housing is closed. FIG. 11C illustrates the bottom surface side of the external appearance of the mobile phone in the state in which the housing is closed. FIGS. 11D and 11E are perspective views from the top surface side and the bottom surface side in the state in which the housing is closed.

The mobile phone is, for example, formed of an upper housing 550 and a lower housing 551 that are connected to each other through a connecting section (hinge section) 556, and includes a display 552, a sub-display 553, a key operation section 554, and a camera 555. The display 552 or the sub-display 553 is formed of the liquid crystal display device according to the embodiments.

The technology according to the embodiments of the present disclosure may employ the following configurations.

(1) A display device including:
  a display section in which a plurality of liquid crystals as pixels are arrayed in a matrix,
  a plurality of scan lines which select pixels,
  a plurality of signal lines which supply image signals to the selected pixels, and
  color filters that are arranged so as to correspond to color displays of the pixels, wherein
  the display section includes an effective pixel portion and a frame portion that surrounds the effective pixel portion,
  the frame portion and a wiring circuit of the effective pixel portion are covered with light-shielding layers, the light-shielding layers being separated from each other at a certain separation location in the display section, and a plurality of color filters having different colors are arranged by being stacked at the separation location.

(2) The display device according to (1) above, wherein the separation location is a pixel portion in the left end and a pixel portion in the right end of the effective pixel portion.

(3) The display device according to (1) above, wherein the separation location is located in the frame portion, located in close proximity to the effective pixel portion, and located outside the effective pixel portion.

(4) The display device according to (1) above, wherein the separation location is located in the frame portion and is formed along the frame portion, and the shape of the separation location is a hollow square.

(5) The display device according to (1) above, wherein a pixel substrate including the scan lines and the signal lines and a counter substrate including the color filters are bonded to each other by a seal material, and the shape of the separation location is a hollow square, the separation location being located in a portion of the seal material.

(6) The display device according to any of (1) to (5) above, wherein the pixels include three colors of red, green, and blue.

(7) The display device according to any of (1) to (5) above, wherein the pixels include four colors of red, green, blue, and white.

(8) The display device according to (7) above, wherein the separation location is located in a portion at the left side of the rightmost portion of the effective pixel portion.

(9) The display device according to (7) above, wherein the separation location is located in the frame portion, located in close proximity to the effective pixel portion, and located outside the effective pixel portion.

The present disclosure contains subject matter related to that disclosed in Japanese Priority Patent Application JP 2012-64162 filed in the Japan Patent Office on Mar. 21, 2012, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display device comprising:
a display panel including
a display section in which a plurality of pixels are arrayed in a matrix, the display section including an effective pixel portion and a frame portion that surrounds the effective pixel portion,
a plurality of scan lines that select pixels,
a plurality of signal lines that supply image signals to the pixels,
a substrate,
color filters that are arranged above the substrate so as to correspond to color displays of the pixels,
a light-shielding layer covering the scan lines and the signal lines in the effective pixel portion and the frame portion, and
a polarizer overlapping the color filters and the light-shielding layer through the substrate; and
a cover plate mounted on the display panel, the cover plate having
a first cover portion overlapping the frame portion and a second cover portion other than the first cover portion, a light transmittance of the first cover portion being lower than a light transmittance of the second cover portion, wherein the light-shielding layer has
a separation location in the frame portion, and
a light-shielding material,
the separation location is a region in which the light-shielding material does not exist, and is located between a first part of the light-shielding material and a second part of the light-shielding material in the light-shielding layer,
the color filters are located at an opposite side of the light-shielding layer from the substrate,
some of the color filters overlap the separation location and are not located in the separation location, and
the first cover portion of the cover plate overlaps the separation location of the light-shielding layer, such that the first cover portion, the substrate, and the separation location are stacked in this order.

2. The display device according to claim 1, wherein
the color filters include a red color filter, a blue color filter, and a green color filter, and
two of the color filters overlap the separation location.

3. The display device according to claim 2, wherein at least the blue color filter overlaps the separation location.

4. The display device according to claim 2, wherein at least the red color filter overlaps the separation location.

5. The display device according to claim 2, wherein at least the red color filter and the blue color filter overlap the separation location.

6. The display device according to claim 5, wherein the red color filter and the blue color filter overlap each other.

7. The display device according to claim 2, wherein a light shielding metal faces the first cover portion of the cover plate, the separation location being provided between the first cover portion and the light shielding metal.

8. The display device according to claim 2, wherein the first cover portion of the cover plate overlaps the color filters such that the color filters, the separation location of the light-shielding layer, and the first cover portion of the cover plate are stacked sequentially.

9. The display device according to claim 2, further comprising a light shielding metal that faces the first cover portion of the cover plate, wherein
the first cover portion of the cover plate overlaps the light shielding metal such that the light shielding metal, the color filters, the separation location of the light-shielding layer, and the first cover portion of the cover plate are stacked sequentially.

10. The display device according to claim 1, wherein
the color filters include a red color filter, a blue color filter, and a green color filter, and
none of the color filters are provided in the separation location.

11. The display device according to claim 10, wherein a light shielding metal faces the first cover portion of the cover plate, the separation location being provided between the first cover portion and the light shielding metal.

12. The display device according to claim 1, wherein a light shielding metal faces the first cover portion of the cover plate, the separation location being provided between the first cover portion and the light shielding metal.

13. The display device according to claim 1, wherein the separation location is provided along the effective pixel portion.

14. The display device according to claim 1, wherein the separation location surrounds the effective pixel portion.

15. The display device according to claim 1, wherein
a pixel substrate includes the scan lines and the signal lines,
a counter substrate includes the substrate and the color filters bonded to the substrate by a seal material, and
the separation location is located in a portion of the seal material.

* * * * *